US012118840B2

(12) United States Patent
Liu et al.

(10) Patent No.: US 12,118,840 B2
(45) Date of Patent: Oct. 15, 2024

(54) SYSTEMS AND METHODS FOR PROCESSING TELEMATICS DATA STREAMS FOR EVENT DETECTION

(71) Applicant: Geotab Inc., Oakville (CA)

(72) Inventors: Mengyang Liu, Mississauga (CA); Xiao Ma, Thornhill (CA); Nianlong Yu, Oakville (CA); Wenyang Liu, Richmond Hill (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 18/219,909

(22) Filed: Jul. 10, 2023

(65) Prior Publication Data

US 2024/0104979 A1 Mar. 28, 2024

Related U.S. Application Data

(63) Continuation of application No. 18/132,626, filed on Apr. 10, 2023, now Pat. No. 11,734,969.

(60) Provisional application No. 63/409,971, filed on Sep. 26, 2022.

(51) Int. Cl.
*G07C 5/08* (2006.01)
*G07C 5/00* (2006.01)

(52) U.S. Cl.
CPC ............. *G07C 5/085* (2013.01); *G07C 5/008* (2013.01)

(58) Field of Classification Search
CPC ................................ G07C 5/085; G07C 5/008
See application file for complete search history.

(56) References Cited

U.S. PATENT DOCUMENTS

2015/0246654 A1* 9/2015 Tadic ...................... G01P 15/02 340/436

OTHER PUBLICATIONS

Extended European Search Report for European Application No. 23192220.4, mailed Jan. 22, 2024, 11 pages.
Li Jin et al: "No Pane, No Gain: Efficient Evaluation of Sliding-Window Aggregates over Data Streams", ACM SIGMOD Record, [Online] Mar. 1, 2005 (Mar. 1, 2005), pp. 39-44, XP093116091, Retrieved from the Internet: URL:https://dl.acm.org/doi/pdf/10.1145/105 8150.1058158.
Mencagli Gabriele et al: "Raising the Parallel Abstraction Level for Streaming Analytics Applications", IEEE Access, vol. 7, Sep. 25, 2019 (Sep. 25, 2019), pp. 131944-131961, XP011747453, DOI: 10.1109/ ACCESS.2019.2941183 [retrieved on Sep. 23, 2019].

* cited by examiner

*Primary Examiner* — Michael V Kerrigan
(74) *Attorney, Agent, or Firm* — Lawrence Xin-Tao Yu

(57) ABSTRACT

Systems and methods for processing telematics data streams for event detection are provided. The methods involve operating at least one processor to: receive a telematics data stream; define a plurality of sliding windows for the telematics data stream, each sliding window containing a portion of the telematics data stream, each sliding window overlapping with one or more neighboring sliding windows, each sliding window including: a logical window; a first buffer preceding the logical window; and a second buffer following the logical window; the logical window being adjacent with one or more neighboring logical windows of the one or more neighboring sliding windows without overlapping the one or more neighboring logical windows; identify a vehicle event based on the portion of the telematics data stream contained within one of the sliding windows; and store an indication of the vehicle event.

21 Claims, 6 Drawing Sheets

SYSTEMS AND METHODS FOR PROCESSING TELEMATICS DATA STREAMS FOR EVENT DETECTION

CROSS-REFERENCE TO RELATED APPLICATIONS

This application is a continuation of U.S. patent application Ser. No. 18/132,626 filed Apr. 10, 2023 and titled "SYSTEMS AND METHODS FOR PROCESSING TELEMATICS DATA STREAMS FOR EVENT DETECTION", which claims priority to U.S. Provisional Patent Application No. 63/409,971 filed Sep. 26, 2022 and titled "STREAMING DATA DUPLICATION REMOVAL", the contents of which are incorporated herein by reference for all purposes.

FIELD

The embodiments described herein generally relate to telematics data streams, and in particular, to processing telematics data streams for event detection.

BACKGROUND

The following is not an admission that anything discussed below is part of the prior art or part of the common general knowledge of a person skilled in the art.

Telematics devices can gather telematics data from various assets, such as, but not limited to, vehicles. Some types of telematics data may be received in the form of data streams, or continuous flows of data. It can be challenging to process telematics data streams, especially at scale (i.e., with high rates and large volumes). One problem associated with processing telematics data streams is duplicate event detection (i.e., the same event being erroneously detected multiple times).

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with a broad aspect, there is provided a system for processing telematics data streams for event detection. The system includes: at least one data store operable to store telematics data; and at least one processor in communication with the at least one data store, the at least one processor operable to: receive a telematics data stream originating from a telematics device installed in a vehicle; define a plurality of sliding windows for the telematics data stream, each sliding window containing a portion of the telematics data stream, each sliding window overlapping with one or more neighboring sliding windows, each sliding window including: a logical window; a first buffer preceding the logical window; and a second buffer following the logical window; the logical window being adjacent with one or more neighboring logical windows of the one or more neighboring sliding windows without overlapping the one or more neighboring logical windows; identify a vehicle event based on the portion of the telematics data stream contained within one of the sliding windows; store an indication of the vehicle event in association with at least some of the portion of the telematics data stream at the data store.

In some embodiments, the start of the vehicle event can occur within one and only one of the logical windows.

In some embodiments, the length of both the first and second buffer can be greater than the length of the vehicle event.

In some embodiments, the length of each logical window can be equal to the distance between the start of each pair of neighboring sliding windows.

In some embodiments, the length of each first buffer can be equal to the length of each second buffer.

In some embodiments, the length of each sliding window can be the same.

In some embodiments, the length of each logical window can be the same.

In some embodiments, the vehicle event can be a first vehicle event, the one of the sliding windows can be a first sliding window, and the at least one processor can be further operable to: identify a second vehicle event based on the portion of the telematics data stream contained within a second sliding window.

In some embodiments, the start of the first vehicle event can occur within the logical window of the first sliding window and the start of the second vehicle event can occur within the logical window of the second sliding window.

In some embodiments, the length of each logical window can be greater than the length of the first and second vehicle events.

In some embodiments, the vehicle event can be a vehicle collision event.

In some embodiments, the telematics data stream can include an acceleration data stream.

In some embodiments, the telematics data stream can include a location data stream.

In some embodiments, the at least one processor can be remotely located from the telematics device.

In accordance with a broad aspect, there is provided a method for processing telematics data streams for event detection. The method involves operating at least one processor to: receive a telematics data stream originating from a telematics device installed in a vehicle; define a plurality of sliding windows for the telematics data stream, each sliding window containing a portion of the telematics data stream, each sliding window overlapping with one or more neighboring sliding windows, each sliding window including: a logical window; a first buffer preceding the logical window; and a second buffer following the logical window; the logical window being adjacent with one or more neighboring logical windows of the one or more neighboring sliding windows without overlapping the one or more neighboring logical windows; identify a vehicle event based on the portion of the telematics data stream contained within one of the sliding windows; and store an indication of the vehicle event in association with at least some of the portion of the telematics data stream.

In some embodiments, the start of the vehicle event can occur within one and only one of the logical windows.

In some embodiments, the length of both the first and second buffer can be greater than the length of the vehicle event.

In some embodiments, the length of each logical window can be equal to the distance between the start of each pair of neighboring sliding windows.

In some embodiments, the length of each first buffer can be equal to the length of each second buffer.

In some embodiments, the length of each sliding window can be the same.

In some embodiments, the length of each logical window can be the same.

In some embodiments, the vehicle event can be a first vehicle event, the one of the sliding windows can be a first sliding window, and the method can further involve operating the at least one processor to: identify a second vehicle event based on the portion of the telematics data stream contained within a second sliding window.

In some embodiments, the start of the first vehicle event can occur within the logical window of the first sliding window and the start of the second vehicle event can occur within the logical window of the second sliding window.

In some embodiments, the length of each logical window can be greater than the length of the first and second vehicle events.

In some embodiments, the vehicle event can be a vehicle collision event.

In some embodiments, the telematics data stream can include an acceleration data stream.

In some embodiments, the telematics data stream can include a location data stream.

In some embodiments, the at least one processor can be remotely located from the telematics device.

In accordance with a broad aspect, there is provided a non-transitory computer readable medium having instructions stored thereon executable by at least one processor to implement any one of the methods herein.

BRIEF DESCRIPTION OF THE DRAWINGS

Several embodiments will be described in detail with reference to the drawings, in which.

Figure 1:
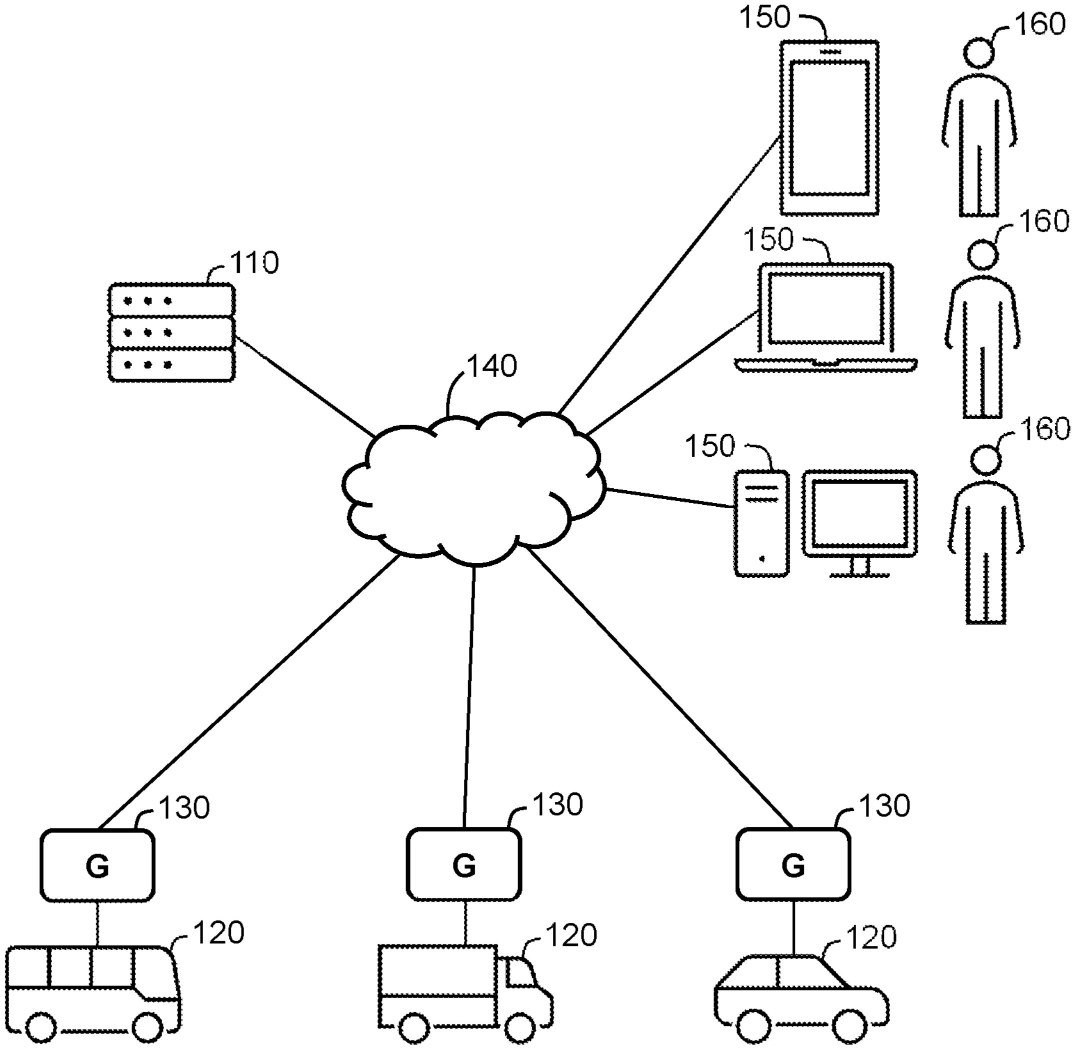
FIG. 1 is a block diagram of various components interacting with an example fleet management system, in accordance with an embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DETAILED DESCRIPTION

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Referring to FIG. 1, there is shown an example fleet management system 110 for managing a plurality of assets equipped with a plurality of telematics devices 130. In operation, the telematics devices 130 can gather various data associated with the assets (i.e., telematics data) and share the telematics data with the fleet management system 110. The fleet management system 110 can be remotely located from the telematics devices 130 and the assets.

For ease of exposition, various examples will now be described in which the assets are vehicles 120. However, it should be appreciated that the systems and methods described herein may be used to manage other forms of assets in some embodiments. Such assets can generally include any apparatuses, articles, machines, and/or equipment that can be equipped and monitored by the telematics devices 130. For example, other assets may include shipping containers, trailers, construction equipment, generators, and the like. The nature and format of the telematics data may vary depending on the type of asset.

The vehicles 120 may include any machines for transporting goods or people. The vehicles 120 can include motor vehicles, such as, but not limited to, motorcycles, cars, trucks, and/or buses. The motor vehicles can be gas, diesel, electric, hybrid, and/or alternative fuel. In some cases, the vehicles 120 may include other kinds of vehicles, such as, but not limited to, railed vehicles (e.g., trains, trams), watercraft (e.g., ships, boats), aircraft (e.g., airplanes, helicopters), and/or spacecraft. Each vehicle 120 can be equipped with a telematics device 130. Although only three vehicles 120 having three telematics devices 130 are shown in the illustrated example for ease of illustration, it should be appreciated that there can be any number of vehicles 120 and telematics devices 130. In some cases, the fleet management system 110 may manage hundreds, thousands, or even millions of vehicles 120 and telematics devices 130.

The telematics devices 130 can be standalone devices that are removably installed in the vehicles 120. Alternatively, the telematics devices 130 can be integrated components that are integral with the vehicles 120. The telematics devices 130 can gather various telematics data from the vehicles 120 and share the telematics data with the fleet management system 110. The telematics data may include any information, parameters, attributes, characteristics, and/or features associated with the vehicles 120. For example, the telematics data can include, but is not limited to, location data, speed data, acceleration data, engine data, brake data, transmission data, fluid data (e.g., oil, coolant, and/or washer fluid), energy data (e.g., battery and/or fuel level), odometer data, vehicle identifying data, error/diagnostic data, tire pressure data, seatbelt data, and/or airbag data. In some cases, the telematics data may include information related to the telematics devices 130 and/or other devices associated with the telematics devices 130.

The fleet management system 110 can process the telematics data collected from the telematics devices 130 to provide various analysis, predictions, and reporting. For example, the fleet management system 110 can process the telematics data to gain additional information regarding the vehicles 120, such as, but not limited to, trip distances/times, idling times, harsh braking/driving, usage rate, and/or fuel economy. Various data analytics and machine learning techniques may be used by the fleet management system 110 to process the telematics data. The telematics data can then be used to manage various aspects of the vehicles 120, such as, but not limited to, route planning, vehicle maintenance, driver compliance, asset utilization, and/or fuel management. In this manner, the fleet management system 110 can improve the productivity, efficiency, safety, and/or sustainability of the vehicles 120.

A plurality of computing devices 150 can provide access to the fleet management system 110 to a plurality of users 160. This may allow the users 160 to manage and track the vehicles 120, for example, using various telematics data collected and/or processed by the fleet management system 110. The computing devices 150 can be any computers, such as, but not limited to, personal computers, portable computers, wearable computers, workstations, desktops, laptops, smartphones, tablets, smartwatches, PDAs (personal digital assistants), and/or mobile devices. The computing devices 150 can be remotely located from the fleet management system 110, telematics devices 130, and vehicles 120. Although only three computing devices 150 operated by three users 160 are shown in the illustrated example for ease of illustration, it should be appreciated that there can be any number of computing devices 150 and users 160. In some cases, the fleet management system 110 may service hundreds, thousands, or even millions of computing devices 150 and users 160.

The fleet management system 110, telematics devices 130, and computing devices 150 can communicate through one or more networks 140. The networks 140 may be wireless, wired, or a combination thereof. The networks 140 may employ any communication protocol and utilize any communication medium. For example, the networks 140 may include, but is not limited to, Wi-Fi™ networks, Ethernet networks, Bluetooth™ networks, NFC (near-field communication) networks, radio networks, cellular networks, and/or satellite networks. The networks 140 may be private, public, or a combination thereof. For example, the networks 140 may include, but is not limited to, LANs (local area networks), WANs (wide area networks), and/or the Internet. The networks 140 may also facilitate communication with other devices and systems that are not shown.

The fleet management system 110 can be implemented using one or more computers. For example, the fleet management system 110 may be implemented using one or more computer servers. The servers can be distributed across a wide geographical area. In some embodiments, the fleet management system 110 may be implemented using a cloud computing platform, such as Google Cloud Platform™ or Amazon Web Services™. In other embodiments, the fleet management system 110 may be implemented using one or more dedicated computer servers.

Figure 2:
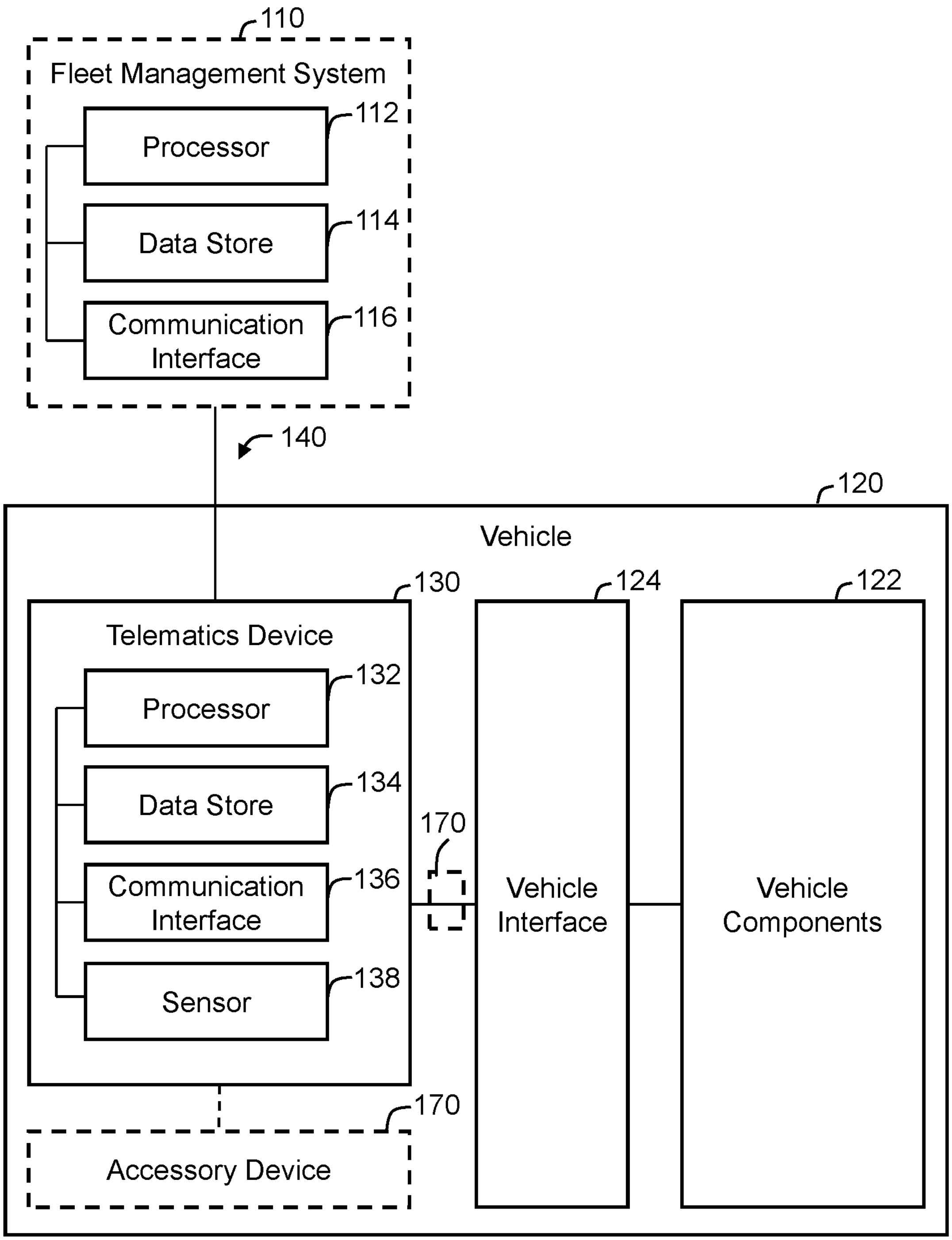
FIG. 2 is a block diagram of an example fleet management system interacting with an example telematics device and example vehicle, in accordance with an embodiment.

Reference will now be made to FIG. 2 to further explain the operation of the fleet management system 110, telematics devices 130, and vehicles 120. In the illustrated example, the fleet management system 110 in communication with a telematics device 130 that is installed in a vehicle 120.

As shown, the fleet management system 110 can include one or more processors 112, one or more data stores 114, and one or more communication interfaces 116. Each of these components may communicate with each other. Each of these components may be combined into fewer components or divided into additional subcomponents. Two or more of these components and/or subcomponents may be distributed across a wide geographical area.

The processors 112 can control the operation of the fleet management system 110. The processors 112 can be implemented using any suitable processing devices or systems, such as, but not limited to, CPUs (central processing units), GPUs (graphics processing units), FPGAs, (field programmable gate arrays), ASICs (application specific integrated circuits), DSPs (digital signal processors), NPUs (neural processing units), QPUs (quantum processing units), microprocessors, and/or controllers. The processors 112 can execute various computer instructions, programs, and/or software stored on the data stores 114 to implement various methods described herein. For example, the processors 112 may process various telematics data collected by the fleet management system 110 from the telematics device 130.

The data stores 114 can store various data for the fleet management system 110. The data stores 114 can be implemented using any suitable data storage devices or systems, such as, but not limited to, RAM (random access memory), ROM (read only memory), flash memory, HDD (hard disk drives), SSD (solid-state drives), magnetic tape drives, optical disc drives, and/or memory cards. The data stores 114 may include volatile memory, non-volatile memory, or a combination thereof. The data stores 114 may include non-transitory computer readable media. The data stores 114 can store various computer instructions, programs, and/or software that can be executed by the processors 112 to implement various methods described herein. The data stores 114 may store various telematics data collected from the telematics device 130 and/or processed by the processors 112.

The communication interfaces 116 can enable communication between the fleet management system 110 and other devices or systems, such as the telematics device 130. The communication interfaces 116 can be implemented using any suitable communication devices or systems. For example, the communication interfaces 116 may include various physical connectors, ports, or terminals, such as, but not limited to, USB (universal serial bus), Ethernet, Thunderbolt, Firewire, SATA (serial advanced technology attachment), PCI (peripheral component interconnect), HDMI (high-definition multimedia interface), and/or DisplayPort. The communication interfaces 116 can also include various wireless interface components to connect to wireless networks, such as, but not limited to, Wi-Fi™, Bluetooth™, NFC, cellular, and/or satellite. The communication interfaces 116 can enable various inputs and outputs to be received at and sent from the fleet management system 110. For example, the communication interfaces 116 may be used to retrieve telematics data from the telematics device 130.

As shown, the telematics device 130 also can include one or more processors 132, one or more data stores 134, and one or more communication interfaces 136. Additionally, the telematics device 130 can include one or more sensors 138. Each of these components may communicate with each other. Each of these components may be combined into fewer components or divided into additional subcomponents.

The processors 132 can control the operation of the telematics device 130. Like the processors 112 of the fleet management system 110, the processors 132 of the telematics device 130 can be implemented using any suitable processing devices or systems. The processors 132 can execute various computer instructions, programs, and/or software stored on the data stores 134. For example, the processors 132 can process various telematics data gathered from the vehicle components 122 or the sensors 138.

The data stores 134 can store various data for the telematics device 130. Like the data stores 114 of the fleet management system 110, the data stores 134 of the telematics device 130 can be implemented using any suitable data storage devices or systems. The data stores 134 can store various computer instructions, programs, and/or software that can be executed by the processors 132. The data stores 134 can also store various telematics data gathered from the vehicle components 122 or the sensors 138.

The communication interfaces 136 can enable communication between the telematics device 130 and other devices or systems, such as the fleet management system 110 and vehicle components 122. Like the communication interfaces 116 of the fleet management system 110, the communication interfaces 136 of the telematics device 130 can be implemented using any suitable communication devices or systems. The communication interfaces 136 can enable various inputs and outputs to be received at and sent from the telematics device 130. For example, the communication interfaces 136 may be used collect telematics data from the vehicle components 122 and sensors 138 or to send telematics data to the fleet management system 110. The communication interfaces 136 can also be used to connect the telematics device 130 with one or more accessory devices 170.

The sensors 138 can detect and/or measure various environmental events and/or changes. The sensors 138 can include any suitable sensing devices or systems, including, but not limited to, location sensors, velocity sensors, acceleration sensors, orientation sensors, vibration sensors, proximity sensors, temperature sensors, humidity sensors, pressure sensors, optical sensors, and/or audio sensors. When the telematics device 130 is installed in the vehicle 120, the sensor 138 can be used to gather telematics data that may not be obtainable from the vehicle components 122. For example, the sensors 138 may include a satellite navigation device, such as, but not limited to, a GPS (global positioning system) receiver, which can measure the location of the vehicle 120. As another example, the sensor 138 may include accelerometers, gyroscopes, magnetometers, and/or IMUs (inertial measurement units), which can measure the acceleration and/or orientation of the vehicle 120.

In some cases, the telematics device 130 may operate in conjunction with one or more accessory devices 170 that are in communication with the telematics device 130. The accessory devices 170 can include expansion devices that can provide additional functionality to the telematics device 130. For example, the accessory devices 170 may provide additional processing, storage, communication, and/or sensing functionality through one or more additional processors, data storages, communication interfaces, and/or sensors (not shown). The accessory devices 170 can also include adapter devices that facilitate communication between the communication interface 136 and the vehicle interfaces 124, such as a cable harness.

The telematics device 130 can be installed within the vehicle 120, removably or integrally. One or more accessory devices 170 can also be installed in the vehicle 120 along with the telematics device 130. As shown, the vehicle 120 can include one or more vehicle components 122 and one or more vehicle interfaces 124. Each of these components may be combined into fewer components or divided into additional subcomponents.

The vehicle components 122 can include any subsystems, parts, and/or subcomponents of the vehicle 120. The vehicle components 122 can be used to operate and/or control the vehicle 120. For example, the vehicle components 122 can include, but are not limited to, powertrains, engines, transmissions, steering, braking, seating, batteries, doors, and/or suspensions. The telematics device 130 can gather various telematics data from the vehicle components 122. For example, the telematics device 130 may communicate with one or more ECUs (electronic control units) that control the vehicle components 122 and/or one or more internal vehicle sensors.

The vehicle interfaces 124 can facilitate communication between the vehicle components 122 and other devices or systems. The vehicle interfaces 124 can include any suitable communication devices or systems. For example, the vehicle interfaces 124 may include, but is not limited to, ODB-II (on-board diagnostics) ports and/or CAN (controller area network) buses. The vehicle interfaces 124 can be used by the telematics device 130 to gather telematics data from the vehicle components 122. For example, the communication interfaces 136 of the telematics device 130 can be connected to the vehicle interfaces 124 to communicate with the vehicle components 122. In some cases, an accessory device 170, such as a wire harness, can provide the connection between the communication interface 136 and the vehicle interface 124.

Figure 3:
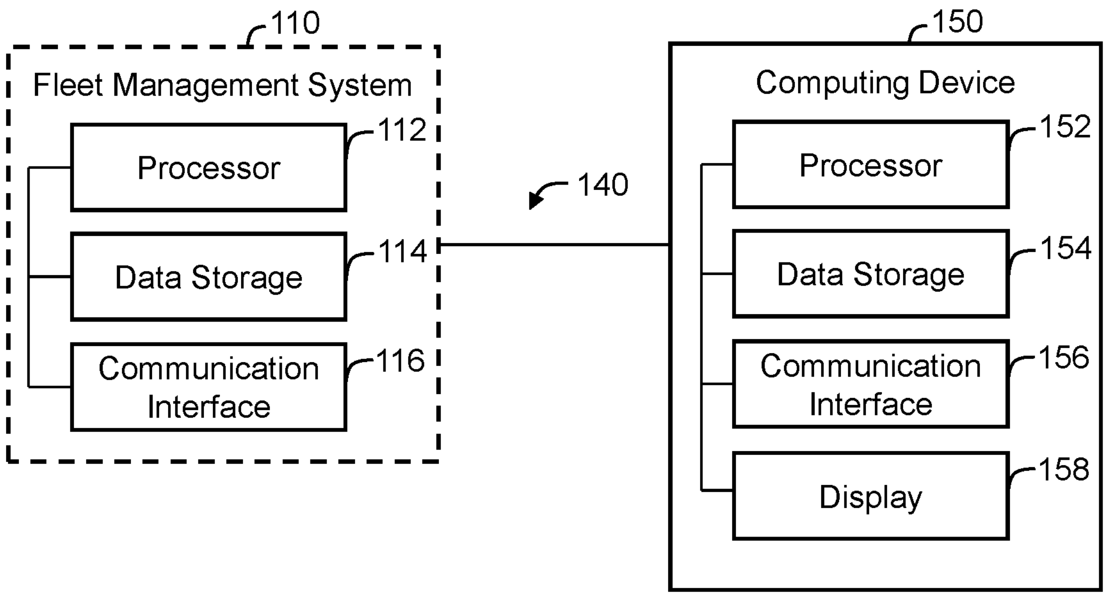
FIG. 3 is a block diagram of an example computing device interacting with an example fleet management system, in accordance with an embodiment.

Reference will now be made to FIG. 3 to further explain the operation of the fleet management system 110 and computing devices 150. In the illustrated example, the fleet management system 110 in communication with a computing device 150. As shown, the computing device 150 also can include one or more processors 152, one or more data stores 154, and one or more communication interfaces 156. Additionally, the computing device 150 can include one or more displays 158. Each of these components can communicate with each other. Each of these components may be combined into fewer components or divided into additional subcomponents.

The processors 152 can control the operation of the computing device 150. Like the processors 112 of the fleet management system 110 and the processors 132 of the telematics device 130, the processors 152 of the computing device 150 can be implemented using any suitable processing devices or systems. The processors 152 can execute various computer instructions, programs, and/or software stored on the data stores 154 to implement various methods described herein. For example, the processors 152 may process various telematics data received from the fleet management system 110 and/or the telematics device 130.

The data stores 154 can store various data for the computing device 150. Like the data stores 114 of the fleet management system 110 and the data stores 134 of the telematics device 130, the data stores 154 of the computing device 150 can be implemented using any suitable data storage devices or systems. The data stores 154 can store various computer instructions, programs, and/or software that can be executed by the processor 152 to implement various methods described herein. The data stores 154 may store various telematics data received from the fleet management system 110 and/or the telematics device 130.

The communication interfaces 156 can enable communication between the computing device 150 and other devices or systems, such as the fleet management system 110. Like the communication interfaces 116 of the fleet management system 110 and the communication interfaces 136 of the telematics device 130, the communication interfaces 156 of the computing device 150 can be implemented using any suitable communication devices or systems. The communication interfaces 156 can enable various inputs and outputs to be received at and sent from the computing device 150. For example, the communication interfaces 116 may be used to retrieve telematics data from the fleet management system 110.

The displays 158 can visually present various data for the computing device 150. The displays 158 can be implemented using any suitable display devices or systems, such as, but not limited to, LED (light-emitting diode) displays, LCDs (liquid crystal displays), ELDs (electroluminescent displays), plasma displays, quantum dot displays, and/or cathode ray tube (CRT) displays. The displays 158 can be an integrated component that is integral with the computing device 150 or a standalone device that is removably connected to the computing device 150. The displays 158 can present various user interfaces for various computer applications, programs, and/or software associated with various methods described herein. For example, the displays 158 may display various visual representations of the telematics data.

Figure 4:
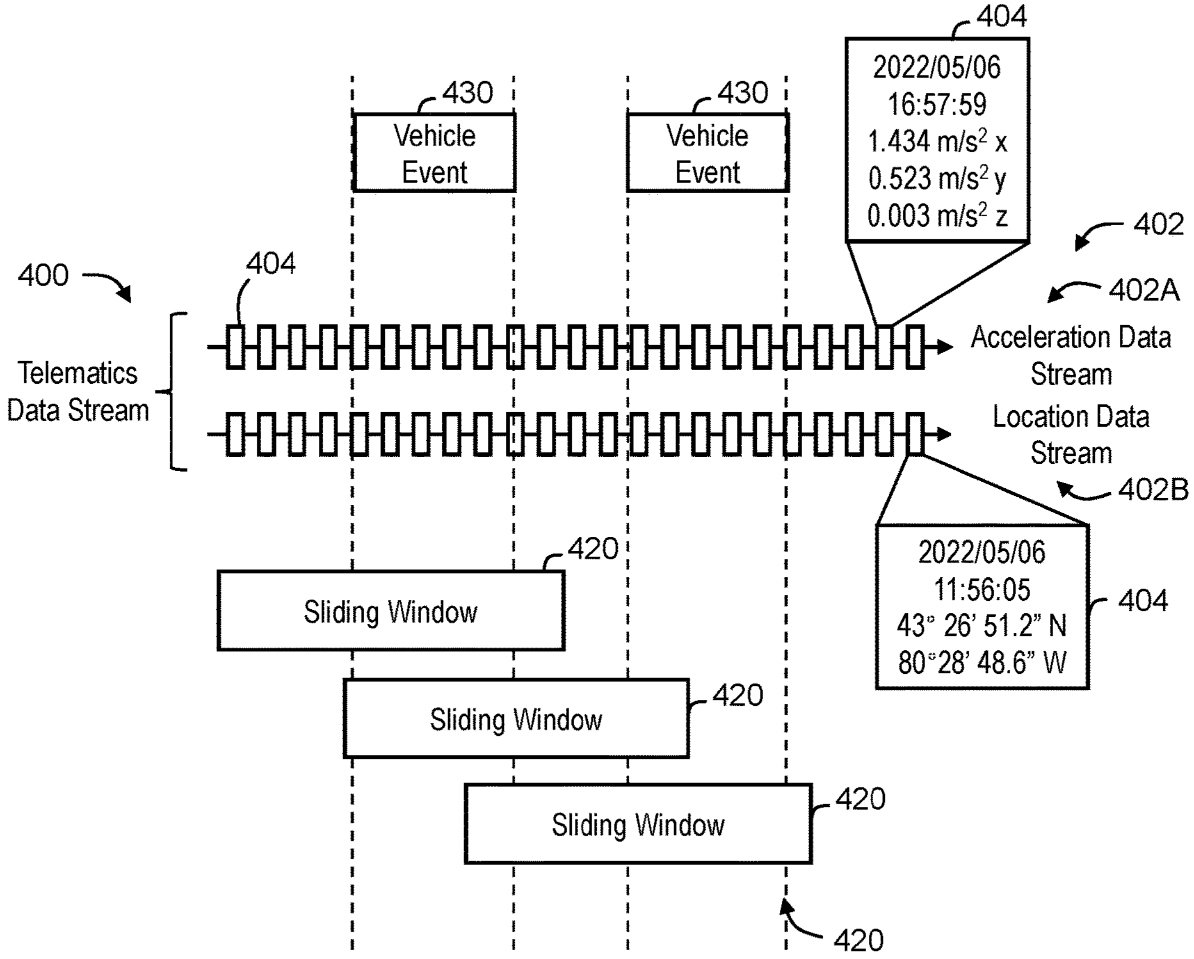
FIG. 4 is a block diagram of an example telematics data stream and sliding windows, in accordance with an embodiment.

Referring now to FIG. 4, there is shown an example telematics data stream 400. The telematics data stream 400 can include various telematics data collected or generated by the telematics device 130. For example, the telematics data stream 400 can originate from a telematics device 130 installed in a vehicle 120. The telematics data stream 400 can represent the continuous arrival or reception of telematics data. For example, the telematics data stream 400 may represent the fleet management system 110 continuously receiving telematics data from a telematics device 130. The telematics data stream 400 may contain a large volume of telematics data that is received at a high rate.

The telematics data stream 400 can include a continuous stream, flow, or sequence of telematics data records 404. Each telematics data record 404 can represent a telematics data point associated with for a particular point in time. In the illustrated example, the telematics data records 404 include acceleration data records that indicate the acceleration of the vehicle 120 at various points in time and location data records that indicate the location of the vehicle 120 at various points in time. It should be appreciated that the telematics data records 404 are a form of electronic data that require a computer to transmit, receive, interpret, process and/or store.

The telematics data records 404 can be ordered with respect to time such that the telematics data stream 400 can include one or more data streams 402 of successive telematics data points. In the illustrated example, the telematics data stream 400 includes an acceleration data stream 402A and a location data stream 402B. However, it should be appreciated that the telematics data stream 400 can contain any number of data streams 402 containing various types of telematics data.

The telematics data stream 400 can be processed to extract various insights from the telematics data contained therein. For example, the telematics data stream 400 may be processed to detect various events 430 associated with the corresponding vehicle 120. Examples of events 430 that may be detected can include, but are not limited to, collisions, loading or unloading, speeding, U-turns, harsh acceleration, harsh cornering, harsh braking, etc. For many types of events 430, it is desirable to detect the event 430 in real time or near real time. However, continuously processing the telematics data stream 400 as the telematics data arrives can be computationally resource intensive, especially if the telematics data stream 400 arrives at a high rate and/or contains large volumes of data. This problem may be exacerbated at scale where there may be hundreds, thousands, millions, or more telematics data streams 400 that require processing.

One way to process the telematics data stream 400 more efficiently is to define sliding windows 420. Each sliding window 420 can contain a portion of the telematics data stream 400. The sliding windows 420 can be used to periodically process segments of the telematics data stream 400, instead of continuously processing the telematics data stream 400 as the telematics data arrives. In this manner, the sliding windows 420 can divide, segment, or portion the telematics data stream 400 for more efficient processing. As shown, the sliding windows 420 can overlap with one another to prevent missed detection of events 430 that may otherwise be split between adjacent sliding windows 420.

Figure 5:
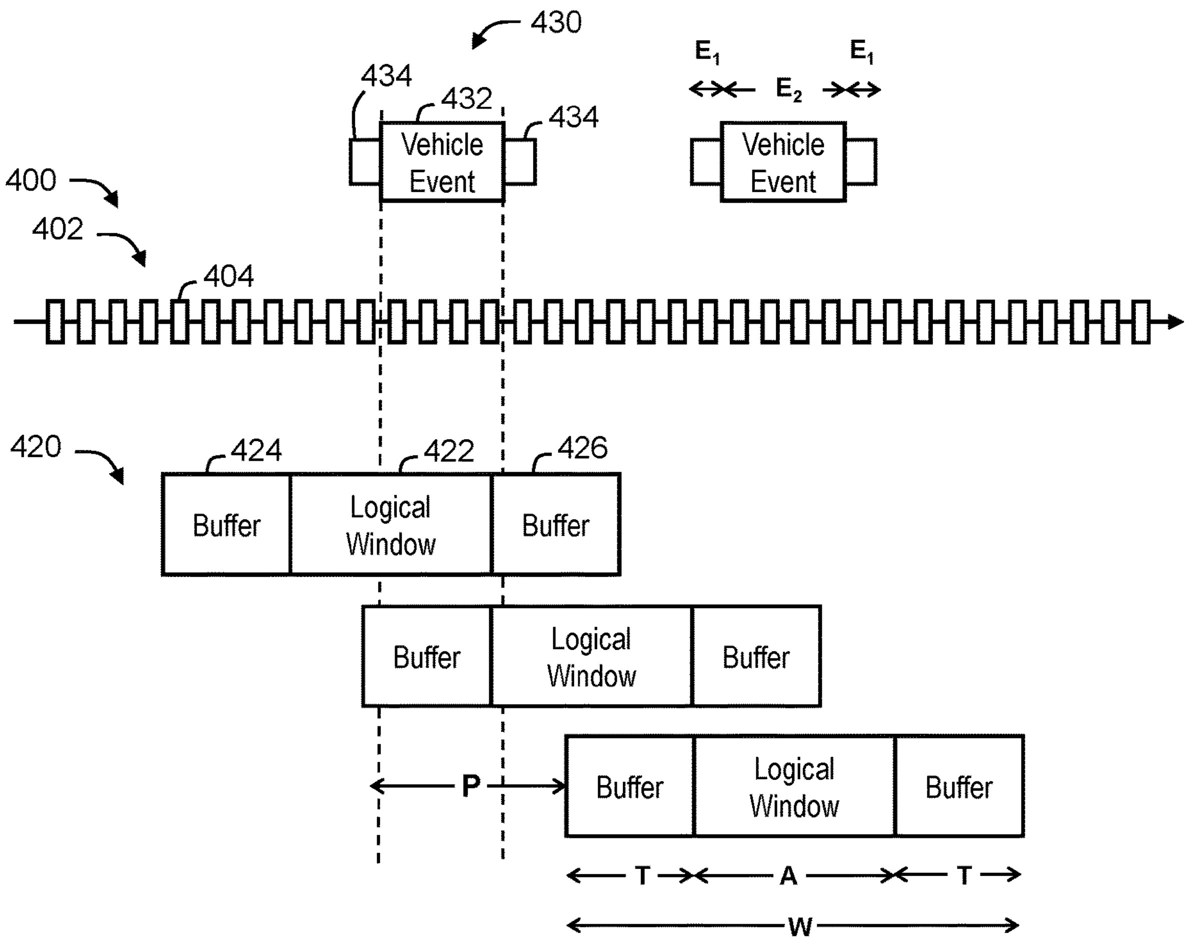
FIG. 5 is a block diagram of another example telematics data stream and sliding windows containing logical windows, in accordance with an embodiment.

A problem that arises with using sliding windows 420 for event detection is that the same event 430 can be erroneously detected multiple times. When duplicate event detection occurs, it can be difficult to distinguish correct, real, or actual events 430 from the erroneous duplicate events. Duplicate event detection can occur when two or more sliding windows 420 overlap and each contain telematics data associated with the same event 430. The inventors recognized and realized that duplicate event detection could be avoided by defining a logical window within each sliding window 420. Reference will now be made to FIG. 5 to further explain the logical windows.

Referring now to FIG. 5, there is shown another example of a telematics data stream 400. As described herein, the telematics data stream 400 can originate from a telematics device 130 installed in a vehicle 120 and can include various telematics data collected or generated by the telematics device 130. As shown, the telematics data stream 400 can include a continuous stream, flow, or sequence of telematics data records 404.

A plurality of sliding windows 420 can be defined to divide, segment, or portion the telematics data stream 400. Each sliding window 420 can contain a portion of the telematics data stream 400. Each sliding window 420 can overlap with one or more neighboring sliding windows 420. Each sliding window 420 can have the same length.

Each sliding window 420 can include a logical window 422. Each logical window 422 can be adjacent with one or more neighboring logical windows 422 of one or more neighboring sliding windows 420 without overlapping the one or more neighboring logical windows 422. Each logical window 420 can have the same length. Since there is no overlap between neighboring logical windows 422, the start of any vehicle event 430 can only occur within one and only one of the logical windows 422. Hence, each vehicle event 430 can be uniquely associated with a single sliding window 420, resulting in prevention of duplicate event detection.

To guarantee each logical window 422 is adjacent to but does not overlap any neighboring logical windows 422, the step size of the sliding windows 420 can be defined to be equal to the length of the logical windows 422. In other words, the length of each logical window 422 can equal to the distance between the start of each pair of neighboring sliding windows 420. The relationship of these parameters can be expressed as:

$$P=A$$

where P is the step size of the sliding windows 420 and A is the length of the logical windows 422.

Each sliding window 420 can also include a first buffer 424 and a second buffer 426. The first buffer 424 can precede the logical window 422 and the second buffer 426 can follow the logical window 422. The length of each first buffer 424 can be equal to the length of each second buffer 426. The first and second buffers 424, 426 can provide room within the sliding window 420 so that the sliding window 420 is large enough to contain the relevant data associated with an event 430.

The data associated with an event 430 can include primary data 432 measured during the event and secondary data 434 measured prior to or subsequent to the event 430. Both the primary and secondary data 432, 434 may be useful in analyzing the event 430. For example, the primary data 432 may be used to detect the event and the secondary data 434 may be used to determine the cause and outcome of the event. The relationship of these parameters can be expressed as:

$$E=2E_1+E_2$$

where E is the total length of the event 430, $E_2$ is the length primary portion 432, and $2E_1$ is the total length of secondary portion 434. It should be appreciated that the sections of the secondary portion 434 prior to and subsequent to the event 430 may not be equal in length in some cases.

To ensure that the entirety of an event 430 (including both primary and secondary portion 432, 434) fits within at least one of the sliding windows 420, the length of the first and second buffers 424, 426 can be defined to be greater than the length of the event 430. In this manner, each event 430 can be contained within at least one sliding window 420 and both the primary and secondary portions 432, 434 can be made available within that sliding window 420. The relationship of these parameters can be expressed as:

$$T>E$$

where T is the length of the first and second buffers 424, 426 and E is the total length of the event 430.

The total length of each sliding window 420 can be defined based on the lengths of the logical window 422 and the first and second buffers 424, 426. The relationship of these parameters can be expressed as:

$$W=2T+A$$

where T is the length of the first and second buffers 424, 426 and A is the length of the logical window 422.

The various parameters of the sliding windows 420 can be adjusted, modified, or tuned to help improve performance. For example, the buffer size T can be minimized or reduced to approach the total event length E. Similarly, the sliding window step size P can be increased or decreased. Increasing the window step size P can reduce the amount of computational resources at the cost of increasing latency (resulting in a smaller number of larger sliding windows 420). Reducing the window step size P can reduce latency but may require more computational resources (resulting in a greater number of smaller sliding windows 420).

Figure 6:
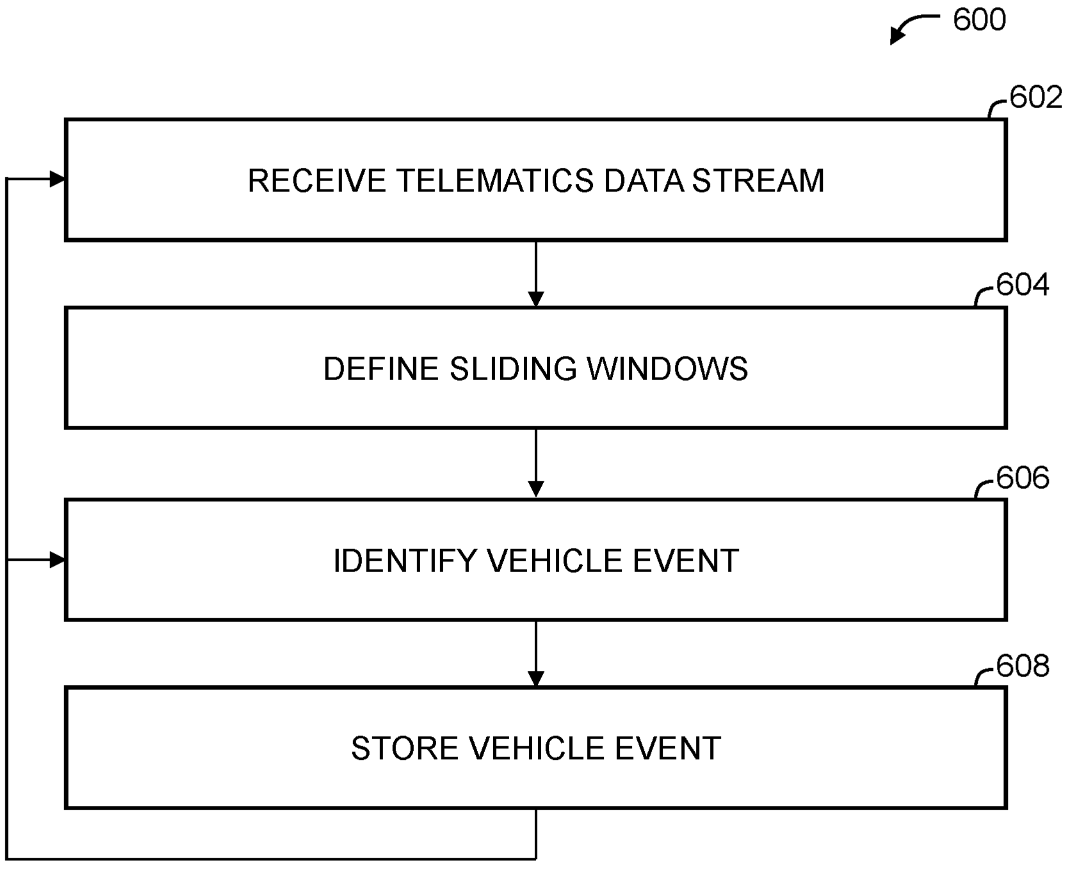
FIG. 6 is a flow chart of an example method for processing telematics data streams for event detection, in accordance with an embodiment.

Referring now to FIG. 6, there is shown an example method 600 for processing telematics data streams 400 for event detection. The telematics stream processing method 600 can be used to define sliding windows 420 containing logical windows 422 to prevent duplicate event detection.

The telematics stream processing method 600 can implemented at the fleet management system 110 (e.g., by at least one processor 112 executing instructions stored on at least one data store 114). An advantage of implementing at least a portion of the telematics stream processing method 600 at the fleet management system 110 (i.e., remote from telematics devices 130 and computing devices 150) is that less processing may be executed at the telematics devices 130 and/or computing devices 150. Hence, the hardware complexity and cost of the telematics devices 130 and/or computing devices 150 can be reduced. Furthermore, it may be easier to update and/or modify software running on the fleet management system 110 as compared to the telematics devices 130 and/or computing devices 150. However, it should be appreciated that the telematics stream processing method 600 may also be implemented, at least in part, using one or more telematics devices 130, one or more computing devices 150, or a combination thereof in some embodiments. That is, the telematics stream processing method 600 may be implemented by any of the one or more processors 112, 132, 152 executing instructions stored on any of the one or more data stores 114, 134, 154.

At 602, a telematics data stream 400 can be received. The telematics data stream 400 can originate from a telematics device 130 installed in a vehicle 120. For example, the fleet management system 110 may receive a stream of telematics data from a telematics device 130. The telematics data stream 400 can include various types of telematics data collected or generated by the telematics device 130. For example, the telematics data stream 400 may include an acceleration data stream 400A. As another example, the telematics data stream 400 may include a location data stream 400B.

At 604, a plurality of sliding windows 420 can be defined for the telematics data stream 400. For example, the fleet management system 110 may define the sliding windows 420. Each sliding window 420 can contain a portion of the telematics data stream 400. Each sliding window 420 can overlap with one or more neighboring sliding windows 420. As described herein, the overlap of neighboring sliding windows 420 can prevent vehicle events 430 from being split between neighboring sliding windows 420, which may result in missed detection of the events 430.

Each sliding window 420 can include a logical window 422, a first buffer 424 preceding the logical window, and a second buffer 426 following the logical window 422. Each logical window 422 can be adjacent with one or more neighboring logical windows 422 of one or more neighboring sliding windows 420 without overlapping the one or more neighboring logical windows 422. As described herein, the logical windows 422 can enable a vehicle event 430 to be uniquely associated with a single sliding window 420 based on the start of the vehicle event 430 occurring within the logical window 422.

The length of each logical window 422 can be equal to the distance between the start of each pair of neighboring sliding windows 420. In other words, the step size of the sliding windows 420 can be equal to the length of the logical windows 422. The length of each sliding window 420 can be the same. The length of each logical window 422 can be the same. The length of each first and second buffer 424, 426 can be the same.

At 606, a vehicle event 430 can be detected. For example, the fleet management system 110 can detect the vehicle event 430. The vehicle event 430 can be any type of event associated with the vehicle 130 that can be detected based on telematics data collected or generated from the telematics device 130. For example, the vehicle event 430 may be a vehicle collision event. The vehicle event 430 can be detected based on the portion of the telematics data stream 400 contained within one of the sliding windows 420. The start of the vehicle event 430 can occur within the logical window 422 of that sliding window 420. As described herein, the start of the vehicle event 430 can only occur within one and only one of the logical windows 422. Duplicate detection of the vehicle event 430 can be prevented because the vehicle event 430 is uniquely associated with a single sliding window 420. As described herein, the length of both the first and second buffers 424, 426 can be greater than the length of the vehicle event 430. In this manner, the entirety of the vehicle event 430 can fit within at least one sliding window 420.

At 608, an indication of the vehicle event 430 can be stored. The indication of the vehicle event 430 can be stored in association with at least some of the portion of the telematics data stream 400 (i.e., corresponding to the sliding window 420). For example, the indication of the vehicle event 430 can be stored at the fleet management system 110.

As shown, the telematics stream processing method 600 can be repeated. In this manner, additional sliding windows 420 can be defined as additional telematics data is received in the telematics data stream 400. Furthermore, additional vehicle events 430 can be detected and stored. For example, a second vehicle event 430 can be detected based on the portion of the telematics data stream 400 contained within one of the sliding windows 420. The sliding window 420 containing the second vehicle event 430 may be the same or different from the sliding window 420 containing the first vehicle event 430. The start of the first and second vehicle events 430 can each occur within single logical window 420 (which may or may not be the same). Likewise, the length of both the first and second buffers 424, 426 can be greater than the length of the first and second vehicle events 430.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device. Furthermore, the term "coupled" may indicate that two elements can be directly coupled to one another or coupled to one another through one or more intermediate elements.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Furthermore, any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). Programmable hardware such as FPGA can also be used as standalone or in combination with other devices. These devices may also have at least one input device (e.g., a pushbutton keyboard, mouse, a touchscreen, and the like), and at least one output device (e.g., a display screen, a printer, a wireless radio, and the like) depending on the nature of the device. The devices may also have at least one communication device (e.g., a network interface).

It should also be noted that there may be some elements that are used to implement at least part of one of the embodiments described herein that may be implemented via software that is written in a high-level computer programming language such as object-oriented programming. Accordingly, the program code may be written in C, C++ or any other suitable programming language and may comprise modules or classes, as is known to those skilled in object-oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

The invention claimed is:

1. A system for processing telematics data streams for event detection, the system comprising:
- at least one data store operable to store telematics data; and
- at least one processor in communication with the at least one data store, the at least one processor operable to:
  - receive a telematics data stream;
  - define a plurality of sliding windows for the telematics data stream, each sliding window containing a portion of the telematics data stream, each sliding window overlapping with one or more neighboring sliding windows, each sliding window comprising a logical window, the logical window being adjacent with one or more neighboring logical windows of the one or more neighboring sliding windows; and
  - identify a vehicle event based on the portion of the telematics data stream contained within one of the sliding windows.

2. The system of claim 1, wherein a start of the vehicle event occurs within one and only one of the logical windows.

3. The system of claim 1, wherein each sliding window comprises at least one buffer.

4. The system of claim 3, wherein a length of the at least one buffer is greater than the length of the vehicle event.

5. The system of claim 3, wherein the at least one buffer comprises a first buffer preceding the logical window and a second buffer following the logical window.

6. The system of claim 1, wherein a length of each logical window is equal to a distance between the start of each pair of neighboring sliding windows.

7. The system of claim 1, wherein a length of each sliding window is the same.

8. The system of claim 1, wherein a length of each logical window is the same.

9. The system of claim 1, wherein the vehicle event is a first vehicle event, one of the sliding windows is a first sliding window, and the at least one processor is further operable to:
- identify a second vehicle event based on the portion of the telematics data stream contained within a second sliding window.

10. The system of claim 9, wherein a start of the first vehicle event occurs within the logical window of the first sliding window and a start of the second vehicle event occurs within the logical window of the second sliding window.

11. A method for processing telematics data streams for event detection, the method comprising operating at least one processor to:
- receive a telematics data stream;
- define a plurality of sliding windows for the telematics data stream, each sliding window containing a portion of the telematics data stream, each sliding window overlapping with one or more neighboring sliding windows, each sliding window comprising a logical window, the logical window being adjacent with one or more neighboring logical windows of the one or more neighboring sliding windows; and
- identify a vehicle event based on the portion of the telematics data stream contained within one of the sliding windows.

12. The method of claim 11, wherein a start of the vehicle event occurs within one and only one of the logical windows.

13. The method of claim 11, wherein each sliding window comprises at least one buffer.

14. The method of claim 13, wherein a length of the at least one buffer is greater than a length of the vehicle event.

15. The method of claim 13, wherein the at least one buffer comprises a first buffer preceding the logical window and a second buffer following the logical window.

16. The method of claim 11, wherein a length of each logical window is equal to the distance between a start of each pair of neighboring sliding windows.

17. The method of claim 11, wherein a length of each sliding window is the same.

18. The method of claim 11, wherein a length of each logical window is the same.

19. The method of claim 11, wherein the vehicle event is a first vehicle event, one of the sliding windows is a first sliding window, and the method further comprises operating the at least one processor to:
- identify a second vehicle event based on the portion of the telematics data stream contained within a second sliding window.

20. The method of claim 19, wherein a start of the first vehicle event occurs within the logical window of the first sliding window and a start of the second vehicle event occurs within the logical window of the second sliding window.

21. A non-transitory computer readable medium having instructions stored thereon executable by at least one processor to implement a method for processing telematics data streams for event detection, the method comprising operating the at least one processor to:
- receive a telematics data stream;
- define a plurality of sliding windows for the telematics data stream, each sliding window containing a portion of the telematics data stream, each sliding window overlapping with one or more neighboring sliding windows, each sliding window comprising a logical window, the logical window being adjacent with one or more neighboring logical windows of the one or more neighboring sliding windows; and
- identify a vehicle event based on the portion of the telematics data stream contained within one of the sliding windows.

* * * * *